United States Patent [19]
Epstein

[11] 3,827,513
[45] Aug. 6, 1974

[54] APPARATUS FOR MEASURING POWDER
[76] Inventor: Irving Epstein, 4216 Shoreclub Dr., Mercer Island, Wash. 98040
[22] Filed: Jan. 15, 1973
[21] Appl. No.: 323,978

[52] U.S. Cl............. 177/121, 177/123, 177/DIG. 6
[51] Int. Cl. ...................... G01g 13/04, G01g 13/02
[58] Field of Search ........... 177/119, 120, 122, 123, 177/246, DIG. 6

[56] References Cited
UNITED STATES PATENTS
2,055,730   9/1936   Rees ............................ 177/DIG. 6
2,539,030   1/1951   Parker.......................... 177/246 UX
3,189,110   6/1965   Yarborough.................... 177/DIG. 6
3,506,111   4/1970   Eppenberger...................... 177/120

FOREIGN PATENTS OR APPLICATIONS
369,369   3/1932   Great Britain...................... 177/122

Primary Examiner—George H. Miller, Jr.

[57] ABSTRACT

An automatic gun powder weighing scale comprising a beam and a screw conveyor controlled by the rocking of the beam.

7 Claims, 10 Drawing Figures

APPARATUS FOR MEASURING POWDER

Sportsmen who own and use hand guns, particularly those who engage in competition shooting, often desire to load their own ammunition. Close control of the amount of powder in a given cartridge is necessary in order to compensate for characteristics of the gun and for varying ambient atmospheric conditions. The sportsman generally desires not only that a single charge of powder be accurately measured, but also that such accuracy be maintained in successive charges of powder. This invention is for an apparatus that is capable of measuring out a desired amount of powder with a high degree of accuracy, and is also capable of measuring out successive charges of powder with the same high degree of accuracy.

Some sportsmen whose load their own cartridges have a balance and a dipper for dipping powder out of the can or reservoir and weighing the powder on the balance. If too much powder has been placed on the pan, it is necessary to remove the powder from the pan until the balance balances. Then, the powder can be placed in the shell for the cartridge. Such a procedure is time consuming, and, sometimes frustrating to the person loading the powder. For example, if a person measures too much powder onto the balance pan, it is necessary to remove the powder. Now, if the person removes too much powder, it is necessary to add more powder. Then, there is the possibility of adding too much powder. This approach can be repeated a number of times until the right amount of powder has been measured onto the pan. From having loaded my own cartridges, I realize some of the frustrations involved, such as just described. Further, this process is time consuming and the number of cartridges I can load at one sitting is relatively limited.

With a background having loaded cartridges, I have developed the subject invention wherein it is possible to accurately measure out successive charges of powder for loading in the cartridges. The apparatus comprises a hopper with a motor-operated screw feeder for the dispensing of powder, a beam balance to weigh the powder, a light-sensitive electric control circuit controlled by the balance beam position, and which circuit controls the motor driving the powder feeder. The electrical supply for the motor and for the electrical control circuit may be 110–120 volts alternating current, or may be 12 volts direct current, or a suitable available voltage.

Accordingly, it is an object of this invention to provide an apparatus capable of accurately measuring successive charges of ammunition powder for loading in the cartridges; to provide an apparatus which is small in volume and can be easily stored; a further object is to provide such an apparatus which is quite quick and fast in measuring out the ammunition powder; another important object is to provide such a measuring apparatus which is easy to use and causes a minimum of frustration to the user; an additional object is to provide such a measuring apparatus which is substantially self-controlling or may be automatic in that a switch can be thrown and the apparatus measure the powder and then automatically shut off itself so as to not measure any more powder; and, a further important object is to provide such an apparatus which runs or functions off a normal electrical supply, such as 110–120 volts alternating current or 12 volts direct current or other suitable electrical supply.

These, and other important objects and advantages of the invention, will be brought forth upon reference to the accompanying drawings, the detailed description of the invention, and the claims.

Figure 1:
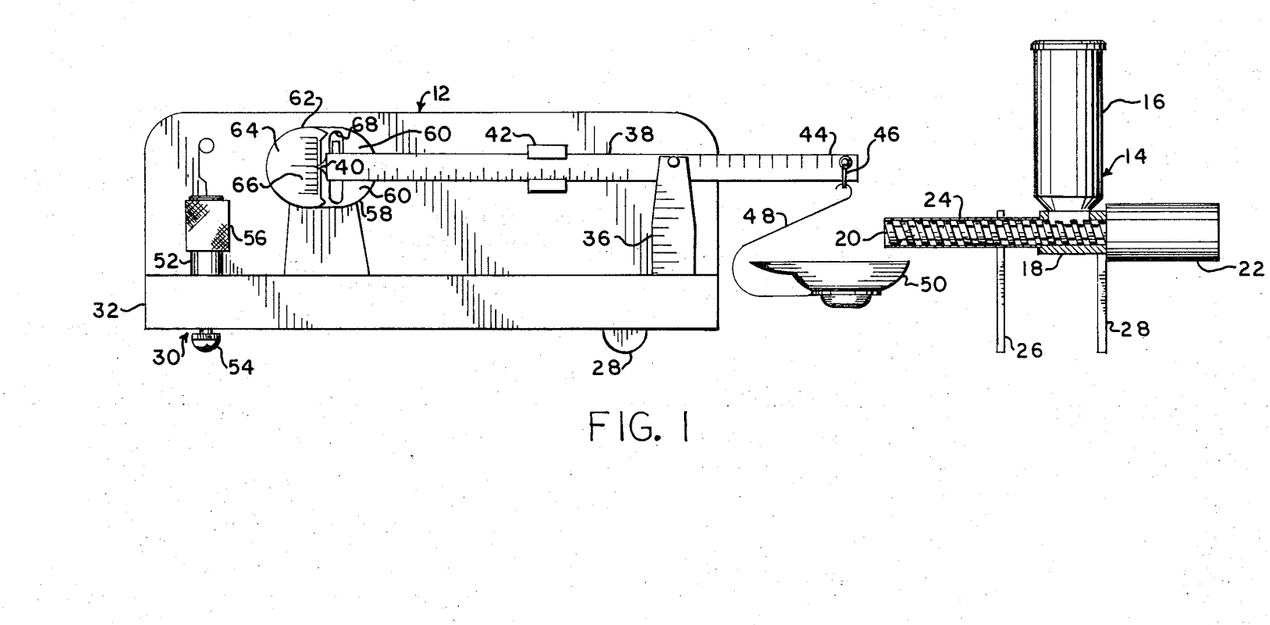
FIG. 1 is a side elevational view of a specific embodiment of the invention constructed in accordance with the preferred teachings thereof and illustrates the means for conveying powder to a means for holding the powder and which means for holding the powder is operatively connected to a means for measuring the powder to be loaded into a cartridge.
Figure 2:
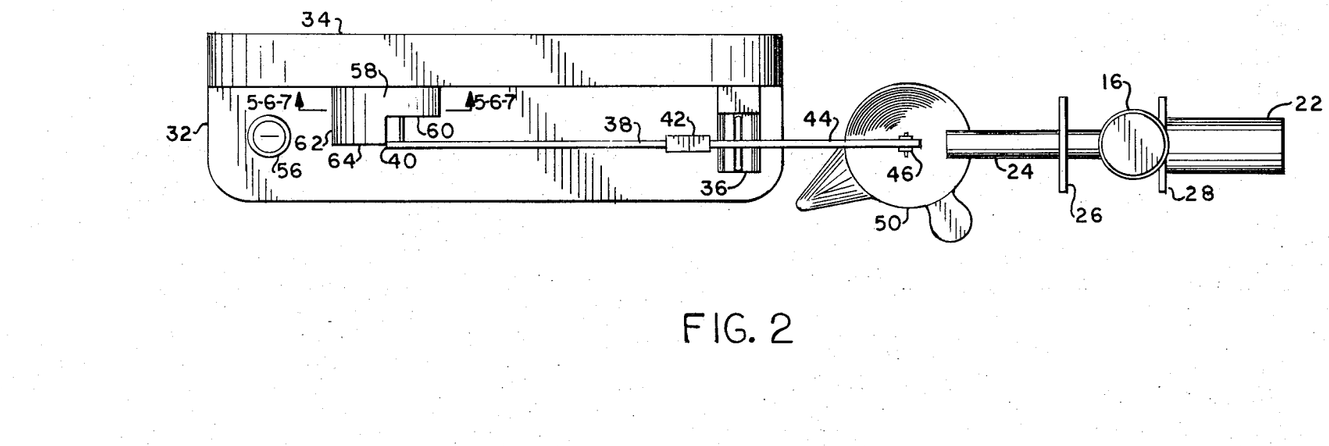
FIG. 2 is a plan view of the apparatus of FIG. 1.
Figure 3:
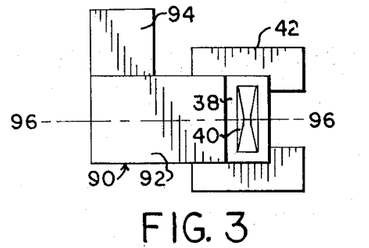
FIG. 3 is an end elevational view of the rockable beam or balance beam and shows a limit member or light interrupter.

The invention comprises a beam balance 12 and a powder feeder 14 as illustrated in FIGS. 1 and 2. The powder feeder 14 comprises a hopper 16 mounted atop a receiver 18. The bottom of the hopper 16 is open to the interior of the receiver 18. A screw conveyor 20, driven gear head electric motor 22 passes completely through the receiver 18 and terminates at the outer end of the tube 24. The powder feeder 14 is supported by leg 26 which is attached to the tube 24 and by leg 28 which is attached to the receiver 18. The gear head electric motor 22 has a full speed at the output shaft of approximately 16 rpm, and is capable of being operated at half speed, say, approximately 8 rpm. The beam balance 12, which may be of a commercially available type, comprises a frame 26 supported on legs 28 and leveling means 30. Frame 26 comprises a horizontal member 32 and an upright 34. Extending vertically from the horizontal member 32 there is a fulcrum 36 which supports balance beam 38. The balance beam 38 in the portion between the fulcrum 36 and the indicator 40 at the left end of the balance beam 38 is graduated to read in grains. Slidably mounted on the balance beam 38 is a counterweight 42. Counterweight 42 is slidable between fulcrum 36 and the indicator 40. At the load end 44 of the balance beam 38, there is a shackle 46. Depending from the shackle 46 is a wire frame 48 which supports powder cup 50. The powder cup 50 is positioned to receive powder discharged from powder feeder 14. The leveling means 30 comprises a leg 52 which is threaded through the horizontal member 32 of the beam balance 12. The lower end of the leg 52 terminates in a button 54. On the upper end of the leg 52 there is knurled knob 56 to assist in turning the leg 52.

Projecting horizontally outwardly from upright 34 there is a hollow housing 58. The housing 58 has, on its outer face, a first flat surface 60 and, on an extended portion 62 of the housing 58, there is a second flat surface 64. A scale 66 is marked vertically on the second flat surface 64 as indicated in FIG. 1. The design of the beam balance is such that when the beam is reasonably in balance so that the indicator 40 is within the range of readings on the scale 66, the addition to or subtraction from the powder cup 50 of one-tenth of one grain of material to be weighted, will cause the indicator to deflect one division on the scale 66.

Extending inwardly from the first surface 60 of housing 58 is an arcuate slot 68. With reference to the enlarged scale drawings, FIGS. 5-7, it is seen that the slot 68 is defined by wall 70 and wall 72, which further serve to divide the interior of housing 58 into left chamber 74 and right chamber 76. The walls 70 and 72 extend through the full depth of the housing 58 from the back of the first surface 60 to the upright 34 from which the housing 58 projects. There is an upper passageway 78 extending through the upper portion of walls 70 and 72, and there is a lower passageway 80 extending through the lower portion of walls 70 and 72. Mounted within the chamber 74, and spaced a short distance from the wall 70, are two light-responsive elements 82 and 84. Element 82 is aligned with the longitudinal center line of upper passageway 78, and element 84 is longitudinally aligned with lower passageway 80. Mounted within the right chamber 76, a short distance from the wall 72, there are two electric lights 86 and 88. The light 86 is aligned with the longitudinal center line of upper passageway 78, and the light 88 is aligned with the longitudinal center line of lower passageway 80. It can be seen that, unless interfered with, light from the electric light 86 will pass through upper passageway 78 and can be detected by the light-responsive elecent 82 so as to enable the element 82 to complete an electric circuit. It can also be seen that, unless interfered with, light from electric light 88 can pass through lower passageway 80 so as to be received by light-sensitive element 84.

Figure 4:
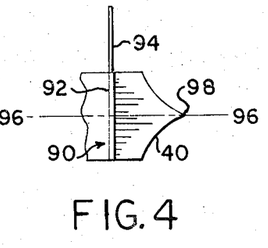
FIG. 4 is a fragmentary side elevational view of the portion of the rockable beam which includes the light interrupter.

The basic purpose of the slot 68 is to provide a means to limit rotation of the balance beam 38 around the fulcrum 36. A limit member 90, affixed to balance beam 38, extends perpendicularly from the balance beam 38 into slot 68. The thickness of the limit member 90, as seen in FIG. 4, is less than the width of the arcuate slot 68. The limit member 90 comprises a horizontal arm 92 and an upwardly extending tab 94. It will be noted, in FIGS. 5-7 that the height of the limit member 90, including arm 92 and tab 94, is less than the distance between the upper passageway 78 and the lower passageway 80 in housing 58. It should also be noted that the point 98 of indicator 40 at the end of balance beam 38 is coincident with the longitudinal center line 96 of the balance beam 38 and therefore of the horizontal arm 92.

Figure 5:
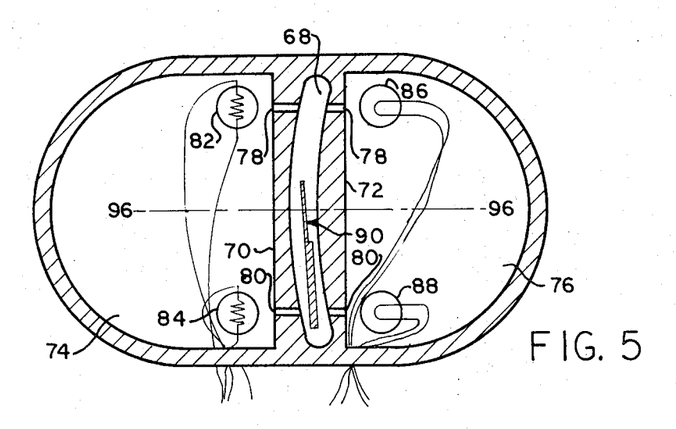
FIG. 5, on an enlarged scale, taken on line 5—5 of FIG. 2, is a vertical cross-sectional view illustrating the position of the limit member with respect to the lower light source and photo-electric cell and shows the limit member interrupting the light rays from the light source to the photoelectric cell.

In operation, when the powder cup is empty, the counterweight 42 is set at 0 on the balance beam scale. The leveling means 30 is then utilized to raise or lower the left end of the frame 26 so as to center the indicator 40 in the middle of the scale 66 on the second flat surface 64. The counterweight 42 is then moved to the left along the balance beam scale to the desired marking indicating the number of grains that it is desired to measure out from the powder feeder 14 into the powder cup 50. Such movement of the counterweight 42 to the left will cause the left end of the balance beam 38 to move downwardly so that the limit member 90 will rest at the bottom of the slot 68 in housing 58. As powder is delivered to the powder cup 50 by the powder feeder 14, the right end of the balance beam 38 will tend to move downwards about the fulcrum 36, and the left end of the balance beam will tend to rise. FIG. 5 represents the position of the limit member 90 in slot 68 at a point in time when sufficient powder has been added to powder cup 50 to cause the limit member 90 to move upward from its resting space on the bottom of slot 68. At that point there is still less than the desired charge of powder in the powder cup 50. It can be seen that when the limit member 90 is in the position indicated in FIG. 5, light-responsive element 82 can be energized by the light from electric light 86, but the light-responsive element 84 cannot be energized by the light from electric light 88. When the limit member 90 is in the position indicated in FIG. 5, then, the electric circuit (to be described below) will permit the motor 22 to operate at full speed thus delivering powder to power cup 50 at a high rate. As more powder is added to powder cup 50, the limit member 90 will rise in slot 68 to the position indicated in FIG. 6. In this position, both of the light-responsive elements 82 and 84 are energized, and the electric circuit is so controlled that the motor 22 can operate only at part-speed, thus, delivering powder to the powder cup 50 at approximately half of the full rate. When the pointer 40 on the balance beam 38 reaches the mid-point of scale 66, thus indicating that powder cup 50 contains a full charge of powder, the limit member 90 would be in the position indicated in FIG. 7. In that position light-responsive element 82 could not be energized by light from the electric light 86, but light-responsive element 84 would be energized by light from electric light 88. In this condition of the elements 82 and 84, the electric circuit will not permit the flow of electricity to the motor 22, and thus the flow of powder into powder cup 50 is stopped.

Figure 8:
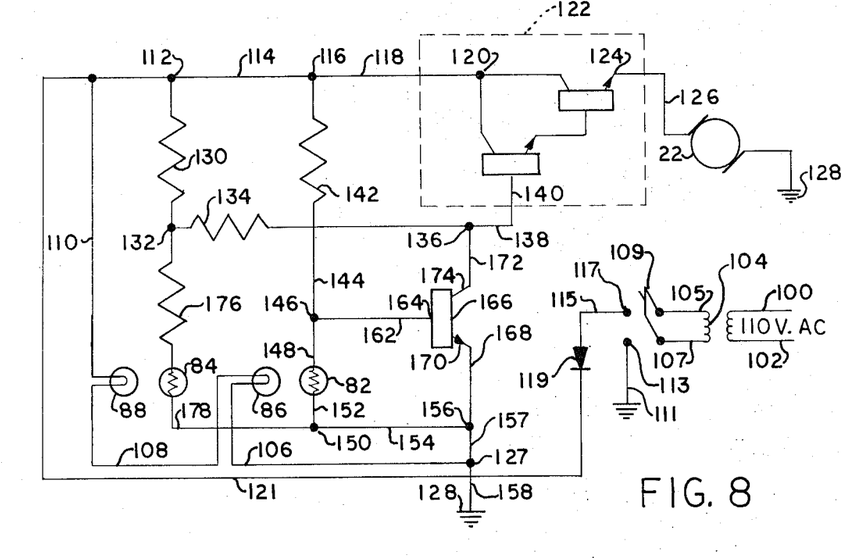
FIG. 8 is a schematic electrical diagram illustrating the electrical control circuit which is responsive to the position of the limit member and which electrical control circuit controls the electric motor for operating the conveyor for conveying ammunition powder to the holding means.

The control circuit diagram is illustrated in FIG. 8. The function of this circuit is to control the speed of the electric motor 22.

There are incoming lines 100 and 102 connecting a source of 110-volt alternating current to a transformer 104, the output of which is 12 volts of alternating current. Lines 105 and 107 connect the transformer 104 to the double-pole single-throw switch 109. Line 111 connects pole 113 of switch 109 to common 128. Line 115 connects pole 117 of switch 109 to a rectifier 119. Line 121 connects rectifier 119 to junction 123. Line 125 connects junction 123 to junction 112. Line 110 connects junction 123 to lamp 88. Line 108 connects lamp 88 to lamp 86. Line 106 connects lamp 86 to junction 127. Line 157 connects junction 125 to junction 156. Line 114 connects junction 112 to junction 116, and line 118 connects junction 116 to the collector 120 of a Darlington pair 122 of transistors. Emitter 124 of Darlington pair 122 is connected to electric motor 22 by line 126. Motor 22 is connected to common 128. Resistor 130 is connected between junction 112 and junction 132. Resistor 134 is connected between junction 132 and junction 136. Line 138 connects junction 136 with base 140 of Darlington pair 122.

The circuit also comprises a group of shunts controlled by light-sensitive elements such as a photocell, to alter the base current to the Darlington pair 122. Resistor 142 is connected to junction 116, and line 144 connects resistor 142 to junction 146. Photocell 82 is connected to junction 146 by line 148, and also to junction 150 by line 152. Line 154 connects junction 150 with junction 156, and line 158 connects junction 125 to common 128. Line 162 connects base 164 of transistor 166 to junction 146. Line 168 connects emitter 170 of transistor 166 to junction 156, and line 172 connects junction 136 to the collector 174 of transistor 166.

Resistor 176 connects junction 132 to photocell 84, and line 178 connects photocell 84 to junction 150.

It will be recalled that when the powder cup 50 is first being filled, the motor 22 is operating at full speed. Under those circumstances, the limit member 90 attached to balance beam 38 is in a position in slot 68 as indicated by FIG. 5. In this position photocell 82 is energized by lamp 86, but photocell 84 cannot be energized by lamp 88 because of the interposition of the limit member or light interrupter 90 between light source 88 and the photocell 82. In effect, then, there is an open circuit between junction 132 and junction 150. Photocell 82 is energized, however, so that current from junction 116 will go to common 128 rather than providing base current for transistor 166. Because of the shunting action of photocell 82, no current will flow from junction 136 at the base of the Darlington pair 122, into the collector of transistor 166. Thus, the Darlington pair will receive full rated base current and the motor 22 can operate at full speed.

Figure 6:
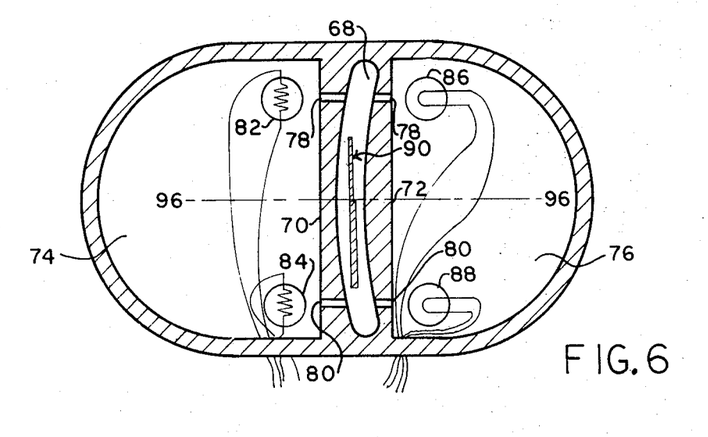
FIG. 6, taken on line 6—6 of FIG. 2, is a vertical cross-sectional view showing the limit member in such a position that it does not interrupt the flow of light from a light source to a photoelectric cell.

When the limit member 90 is in the position indicated in FIG. 6, that is between the photocells so that both photocells 82 and 84 are energized from their respective light sources 86 and 88, current can flow from junction 132 through resistor 176 to common 128 thereby reducing the base current to the Darlington pair 122. In this position of the limit member 90, the photocell 82 is still acting as a shunt so that insufficient base current is received at transistor 166 to permit current flow from the collector 174 to the emitter 170 thereof. The collector current of the Darlington pair 122 has been reduced, and the base current of the Darlington pair 122 has been reduced proportionately more, so that the motor 22 will operate at approximately half speed.

Figure 7:
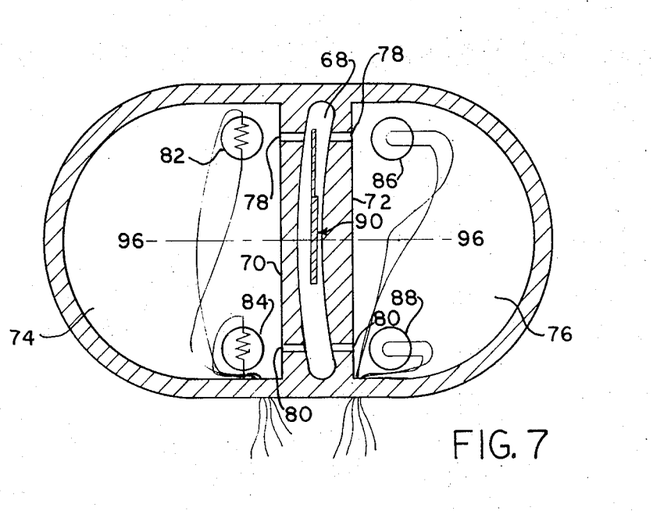
FIG. 7, taken on line 7—7 of FIG. 2, is a vertical cross-sectional view showing the limit member positioned between the upper light source and the upper photoelectric cell and interrupting the flow of light rays between the light source and the photoelectric cell.

When the limit member 90 is in the position in slot 68, indicated by FIG. 7, corresponding to the full desired charge of powder in powder cup 50, photocell 82 becomes de-energized. This provides an open circuit between junction 146 and junction 150. A sufficient base current is then developed for transistor 166 so that current can flow from junction 136 at the base of Darlington pair 122 to common 128. The base current of the Darlington pair 122 having been shunted to ground, no current will flow to the motor 22 and the motor 22 will stop. It can thus be seen that, when the pointer 40 on the balance beam 38 is at the mid point of scale 66, indicating a full charge of powder in powder cup 50, the motor 22 will stop, thus cutting off the flow of powder to the powder cup 50.

From the foregoing description of the electric control circuit, it is seen that by the use of shunts the electric motor 22 can be operated at full speed, half speed, or at no speed. When the powder cup 50 is empty, or substantially empty, the light from the source 88 to the photoelectric cell 84 is cut off or there is no flow of light and the full current of the circuit goes to the motor 22. With some powder in the cup 50, the limit member 90 or light interrupter 90 is moved so as not to be between the light source 88 and the photoelectric cell 84 so that light flows from the source 88 to the cell 84 and the cell 84 acts as a shunt to reduce the amount of electric power flowing to the electric motor 22. As a result, the electric motor 22 functions at, approximately, half speed so that the screw conveyor functions at, approximately, half speed. In other words, the amount of powder being delivered to the cup 50 is reduced considerably. Then, with the powder cup 50 having, substantially, the measured quantity of powder, the limit member 90 or light interrupter 90 passes between the light source 86 and the photoelectric cell 82 so that the electric current is shunted through the photoelectric cell 84 and, substantially, no electric power flows to the motor 22. Actually, the output shaft of the motor 22, connected to the screw conveyor, ceases to rotate and no more powder is delivered to the powder cup 50. At this stage, the powder cup 50 has received the desired measured quantity of powder. The circuit makes it possible to, rapidly, deliver a large quantity of powder at the initial part of the measuring operation. Then, after some of the powder has been delivered, the rate of delivery is reduced and there is less possibility of delivering too much powder to the cup 50.

In operation, a supply of powder is placed in the hopper 16 of powder feeder 14. An empty powder cup 50 is placed on wire frame 48. The counterweight 42 is placed at "0" on the balance beam 38. The balance beam pointer 40 is brought to the mid point of scale 66 by adjusting with knob 56. The counterweight 42 is then slid along balance beam 38 to the desired point. The electric circuit is then energized such as by closing the switch 104. The motor 22 will start, and then will stop automatically when the desired charge of powder is in the powder cup 50.

Figure 9:
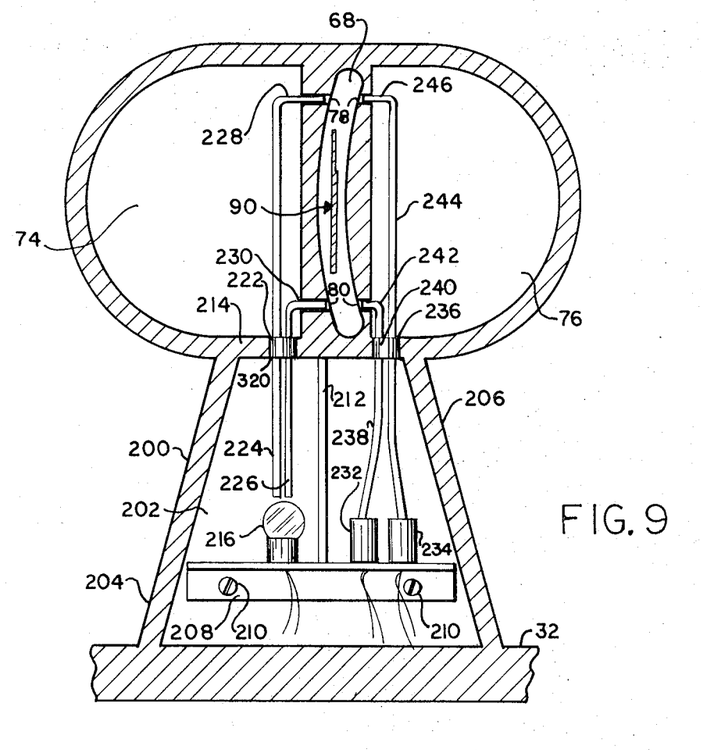
FIG. 9, taken at line 9—9 of FIG. 2, is a vertical cross-sectional view showing the limit member in the same position as in FIG. 6 but also showing an alternate method of providing light beams, that is, by means of optical fiber tubes transmitting light from a single external source; and, FIG. 10 is a schematic electrical diagram illustrating the electrical control circuit using a single light source such as is suitable for use with the embodiment of FIG. 9 using optical fiber tubes.
Figure 10:
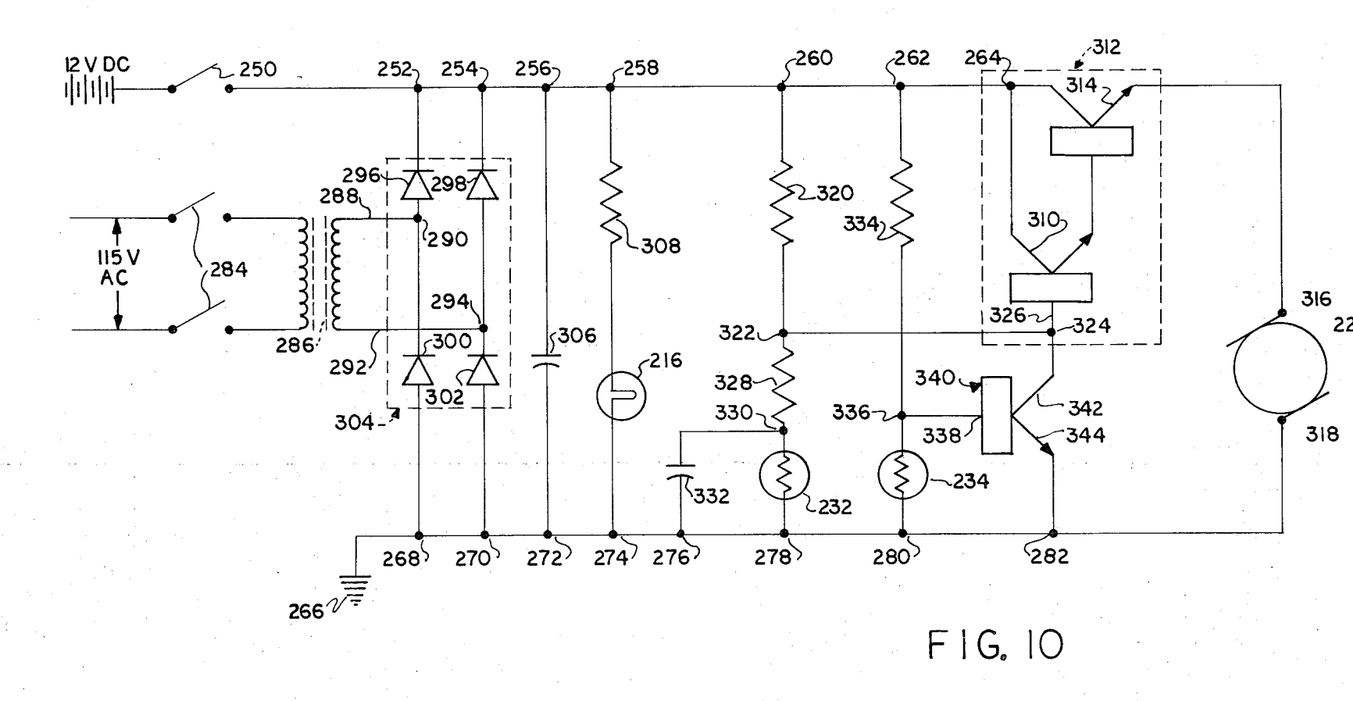

An alternate means by which the speed of the motor 22 may be controlled by movement of the limit member 90 within slot 68 is illustrated in FIGS. 9 and 10. The source of light and the photocells are located outside the housing 58, and optical fibers, capable of transmitting light, are used, instead of the method illustrated in FIGS. 5-7, wherein each photocell has a separate source of light so arranged as to play directly on the photocell receiving surface.

With respect to the alternate arrangement illustrated in FIG. 9, it is seen that, between the housing 58 and the deck 32, there is a housing 200 having a lateral wall 202 connecting side walls 204 and 206. A shelf 208 is secured to the lateral wall 202 by screws 210. An opaque divider 212 extends between the shelf 208 and the bottom 214 of housing 58. A lamp 216 is located in socket 218 which is attached to shelf 208 on one side of the divider 212. A hole 220 in the bottom 214 of housing 58 communicates with chamber 74. Hole 220 is filled with a supporting plug 222, through which pass optical fiber rods 224 and 226. The plug 222 grips the rods 224 and 226 tightly to keep the rods 224 and 226 in place. The upper end of rod 224 terminates in an arm 228 which is approximately perpendicular to the vertical portion. The arm 228 extends into upper passageway 78 in the portion where upper passageway 78 connects chamber 74 with slot 68. Likewise, the upper end of rod 226 terminates in a perpendicular arm 230 which extends into that portion of lower passageway 80 which connects chamber 74 with slot 58.

Photocells 232 and 234, which may be of the cadmium sulfide type, are attached to shelf 208 in the positions illustrated in FIG. 9. Optical fiber rod 238, the lower end of which points at the receiving surface of photocell 232, extends upwardly through plug 240 in hole 236 into chamber 76 in housing 58. The rod 238 is held firmly in place by plug 240. The upper end of rod 238 terminates in a perpendicular arm 242 which extends into lower passageway 80 in the portion where lower passageway 80 connects chamber 76 and slot 68. Optical fiber rod 244 extends upwardly from a point just above the receiving surface of photocell 234, passes through plug 240, which holds it firmly in place, and terminates in a perpendicular arm 246 which extends into that portion of passageway 78 which connects chamber 76 with slot 68.

It will be seen that light from the single lamp 216 is conducted through the optical fiber rods 224 and 226, into passageways 78 and 80, respectively, where corresponding beams of light are cast across the slot 68. If limit member 90 does not interfere with either beam of light, the beams from rods 224 and 226 will be received by rods 244 and 238, respectively, which will conduct light to a position where photocells 234 and 232, respectively, will be energized.

The electric circuit to provide power for the light 216 and the motor 22, and to control the speed of the motor 22, is illustrated in FIG. 8. A source of direct current, which may be 12 volts of direct current as available from an automobile storage battery, is connected to a switch 250.

Switch 250 is connected to junction 252
Junction 252 is connected to junction 254
Junction 254 is connected to junction 256
Junction 256 is connected to junction 258
Junction 258 is connected to junction 260
Junction 260 is connected to junction 262
Junction 262 is connected to junction 264
There is a ground 266. Ground 266 is connected to junction 268.
Junction 268 is connected to junction 270
Junction 270 is connected to junction 272
Junction 272 is connected to junction 274
Junction 274 is connected to junction 276
Junction 276 is connected to junction 278
Junction 278 is connected to junction 280
Junction 280 is connected to junction 282

There is a source of alternating current which may be 115 volts of alternating current, such as is available from a conventional utility system. The alternating current source is connected to a two-pole switch 284 which, in turn, is connected to a transformer 286 which reduces the line voltage to approximately 14 volts of alternating current. A first leg 288 of the secondary side of the transformer 286 is connected to junction 290. A second leg 292 of the secondary side of the transformer 286 is connected to junction 294. There are four rectifiers 296, 298, 300 and 302 forming a bridge rectifier 304.

The cathode of rectifier 296 is connected to junction 252.
The cathode of rectifier 298 is connected to junction 254.
The cathode of rectifier 300 is connected to junction 290.
The cathode of rectifier 302 is connected to junction 294.
The anode of rectifier 296 is connected to junction 290.
The anode of rectifier 298 is connected to junction 294.
The anode of rectifier 300 is connected to junction 268.
The anode of rectifier 302 is connected to junction 270.

The function of bridge rectifier 304 is to change the alternating current input to a pulsed direct current. A capacitor 306 is connected between junction 256 and junction 270. The function of the capacitor 306 is to store the charge voltage from the bridge rectifier 304 and to reduce the peaks of the pulsed direct current from the bridge rectifier 304.

A resistance 308 is connected between junction 258 and light source 216. Light source 216 is connected to junction 274. The resistance 308 limits current in light source 216 to the proper value.

The remainder of the circuit to be described pertains to the drive motor 22 and to the control of the speed of the drive motor. The collector 310 of a Darlington pair 312 of transistors is connected to junction 264. The emitter 314 of the Darlington pair 312 is connected to motor terminal 316. Motor terminal 318 is connected to junction 282.

Resistance 320 is connected between junction 260 and junction 322. Junction 322 is connected to junction 324. Junction 324 is connected to the base 326 of Darlington pair 312.

Resistance 328 is connected between junction 322 and junction 330. Photocell 232 is connected between junction 330 and junction 278. Capacitor 322 is connected between junction 330 and junction 276.

Resistance 334 is connected between junction 262 and junction 336. Photocell 234 is connected between junction 336 and junction 280. Base 338 of transistor 340 is connected to junction 336. Collector 342 of transistor 340 is connected to junction 324. Emitter 344 of transistor 340 is connected to junction 282.

It will be recalled that when the powder cup 50 is first being filled, the motor 22 is operating at full speed. Under these circumstances, the limit member 90 is in the lower portion of slot 68, so as to interfere with the transmission of light from arm 230 of optical rod 226 to arm 242 of optical rod 238; thus, no light is transmitted to photocell 232 in the initial stages of filling the powder cup 50. In effect, then, there is an open circuit between junction 330 and junction 278. Photocell 234 is energized however, so that current from junction 330 will go to ground 266 rather than providing base current for transistor 340. Because of the shunting action of photocell 82, no current will flow from junction 324 at the base of the Darlington pair 312, into the collector of transistor 340. Thus, the Darlington pair 312 will receive full rated base current and the motor 22 can operate at full speed.

When the limit member 90 is in the position indicated in FIG. 9, both photocells 232 and 234 are energized from the light source 216, and current can flow from junction 322 through resistor 328 to ground 266, thereby reducing the base current to the Darlington pair 312. In this position of the limit member 90, the photocell 234 is still acting as a shunt so that insufficient base current is received at transistor 340 to permit current flow from the collector 342 to the emitter 344 thereof. The collector current of the Darlington pair 312 has been reduced, and the base current of the Darlington pair 312 has been reduced proportionately more, so that the motor 22 will operate at reduced speed, preferably half speed. The purpose of the capacitor is to increase temporarily the impedance in the photocell 232 circuit so as to smooth the speed transition and thereby avoid scale bounce, as would occur from an abrupt change in rate of powder flow.

When the limit member 90 is in the position corresponding to a full charge of powder in powder cup 50, the limit member 90 blocks the transmission of light from arm 228 of optical tube 224 to arm 246 of optical tube 244. Photocell 234 becomes de-energized. This action provides an open circuit between junction 336 and junction 280. A sufficient base current is then developed for transistor 340 so that current can flow from junction 324 at the base of Darlington pair 312 to ground 266. The base current of the Darlington pair 312 having been shunted to ground, no current will flow to the motor 22 and the motor 22 will stop. It can thus be seen that, when the pointer 40 on the balance beam 38 is at the mid point of scale 66, indicating a full charge of powder in powder cup 50, the motor 22 will stop, thus cutting off the flow of powder to the powder cup 50.

The second embodiment, using optical fiber rods has the advantage, as compared to the first embodiment of avoiding the use of intricate assembly work within the chambers 74 and 76. It is necessary only to drill the upper and lower passageways 78 and 80 and the holes 220 and 236. A typical rod assembly comprising, for example, the rods 224 and 226 and the plug 222, with the plug located near the lower ends of the rods, can be properly located with the rod ends 228 and 230 inserted into passageways 78 and 80, respectively, and the rods can then be held in place by sliding the plug 222 upwardly until it is engaged in hole 220. Inasmuch as the slot 68 is already formed in the housing 68 of the commercially available beam balance 12, no further work need be done on or in housing 58.

From the foregoing, it is seen that I have provided an apparatus for measuring powder for filling cartridges. This apparatus comprises a new combination of components. A person who desires to load his own cartridges can find this apparatus useful as it is arcuate in the measuring of powder to be placed in the cartridge. When the measured amount of powder has been distributed to the powder cup 50 and the light interrupter 90 or limit member 90 terminates the flow of light from the light source 86 to the photoelectric cell 82, the electric current is shunted away from the electric motor 22 so that no electric power flows to the motor 22 and no more powder is delivered to the cup 50. The apparatus is quick in that in a relatively short span of time the powder can be delivered to the cup 50, then the cup 50 can be emptied into the cartridge space, and the cup 50 placed back in position for receiving more powder. Further, it is easy to use the subject apparatus as a person, after emptying the powder from the cup 50, can place the cup 50 in a position to receive more powder, throw the switch 104 for the introduction of powder into the cup 50 and the electric motor 22 ceases to function after the desired quantity of powder has been measured into the cup 50. Another advantage is that the apparatus is small and can be stored in a relatively small space or volume.

From the foregoing presentation of my invention, what I claim is:

1. An instrument for measuring powder for loading a cartridge, said instrument comprising:
   a. a first means such as a powder cup for holding said powder;
   b. a second means for measuring said powder in said first means;
   c. said first means and said second means being operatively connected;
   d. a third means for conveying said powder to said first means;
   e. said third means comprising a conveyor, a hopper means for introducing said powder to said conveyor and a power means for driving said conveyor;
   f. said second means comprising a weighing scale having a fulcrum and a rockable beam;
   g. said rockable beam being pivoted on said fulcrum;
   h. said first means connecting with and depending from a first end of said rockable beam on one side of said fulcrum;
   i. a movable weight means on said rockable beam and on the other side of said fulcrum and in a counterbalance relationship to said first means;
   j. a fourth means for controlling said power means and said conveyor for conveying powder to said first means;
   k. said fourth means being responsive to the rockable beam;
   l. said fourth means comprising an electric circuit;
   m. said power means comprising an electric motor;
   n. said electric circuit regulating the flow of electrical power to said electric motor;
   o. said electric circuit comprising means responsive to the position of said rockable beam for regulating the flow of said electrical power to said electrical motor;
   p. said electric circuit comprising a fifth means responsive to the position of said rockable beam when said first means has not received the desired measure of powder;

q. said fifth means allowing said electric power to flow to said motor;

r. said electric circuit comprising a sixth means responsive to the position of said rockable beam when said first means has received the desired measure of powder; and, s. said sixth means restricting the flow of said electric power to said motor.

2. An instrument according to claim 1, said instrument comprising:

a. said fifth means comprising a first light source and a first photocell;

b. said sixth means comprising a second light source and a second photocell;

c. said first photocell being in a shunt relationship with said electric motor;

d. said second photocell being in a shunt relationship with said electric motor;

e. a limit member for positioning between said first light source and said first photocell and for positioning between said second light source and said second photocell;

f. with said limit member between said first light source and said first photocell, electric current flowing through said second photocell and said electric power flowing through said electric motor;

g. with said first photocell receiving light from said first light source and, simultaneously, with said second photocell receiving light from said second light source, electric current flowing through said first photocell and flowing through said second photocell and said electric power flowing through said electric motor at a lower rate than when said limit member is positioned between said first light source and said first photocell;

h. with said limit member positioned between said second light source and said second photocell, electric current flowing through said first photocell and, substantially, no electric power flowing to said electric motor and said electric motor, substantially, not functioning; and, i. said limit member operatively connecting with said rockable beam.

3. An instrument according to claim 1, said instrument comprising:

a. said fifth means comprising a shunt for shunting electric power away from said motor;

b. said sixth means comprising a shunt for shunting electric power away from said motor;

c. when said first means has not received the desired measure of powder, said fifth means allows said electric power to flow to said electric motor; and, d. when said first means has received the desired measure of powder, said sixth means shunts said electric power away from said electric motor to deactivate said electric motor.

4. An instrument according to claim 3, said instrument comprising:

a. said conveyor being a screw conveyor; and, b. said first light source and said first photocell, and said second light source and said second photocell being so positioned that with the rotatable movement of said rockable beam and said limit means, the light between said first light source and said first photocell can be interrupted and the light between said second light source and said second photocell can be interrupted.

5. An instrument according to claim 1, said instrument comprising:

a. said fifth means comprising a source of light and a first optical fiber rod operatively connected to a first photocell;

b. said sixth means comprising a source of light and a second optical fiber rod operatively connected to a second photocell;

c. said first photocell being in a shunt relationship with said motor;

d. said second photocell being in a shunt relationship with said motor;

e. a limit member for interrupting the path of light in said first optical fiber rod and for interrupting the path of light in said second optical fiber rod;

f. with said limit member interrupting the path of light in said first optical fiber rod, electric current flowing through said second photocell and said electric current flowing to said electric motor;

g. with said first photocell receiving light from said first optical fiber rod and, simultaneously, with said second photocell receiving light from said second optical fiber rod, electric current flowing through said first photocell ad flowing through said second photocell and said electric power flowing to said electric motor at a lower rate than when said limit member is interrupting the path of light in said first optical fiber rod;

h. with said limit member interrupting the path of light in said second fiber optical rod, electric current flowing through said first photocell and, substantially, no electric power flowing to said electric motor and said electric motor, substantially, not functioning; and, i. said limit member operatively connecting with said rockable beam.

6. An instrument according to claim 5, said instrument comprising:

a. a means to effect a gradual reduction of the amount of electric current flowing to said electric motor when said limit member ceases to interrupt the path of light in said first optical fiber tube;

b. said means comprising a capacitance connected in parallel with said first photocell.

7. An instrument for measuring powder for loading a cartridge, said instrument comprising:

a. a first means such as a powder cup for holding said powder;

b. a second means for measuring said powder in said first means;

c. said first means and said second means being operatively connected;

d. a third means for conveying said powder to said first means;

e. said third means comprising a conveyor, a hopper means for introducing said powder to said conveyor and a power means for driving said conveyor;

f. said second means comprising a weighing scale having a fulcrum and a rockable beam;

g. said rockable beam being pivoted on said fulcrum;

h. said first means connecting with and depending from a first end of said rockable beam on one side of said fulcrum;

i. a movable weight means on said rockable beam and on the other side of said fulcrum and in a counterbalance relationship to said first means;
j. a fourth means for controlling said power means and said conveyor for conveying powder to said first means;
k. said fourth means being responsive to the rockable beam;
l. said fourth means comprising an electric circuit;
m. said power means comprising an electric motor;
n. said electric circuit regulating the flow of electrical power to said electric motor;
o. said electric circuit comprising means responsive to the position of said rockable beam for regulating the flow of said electrical power to said electrical motor;
p. said electric circuit may be operable by a source of alternating current and a source of direct current, selectively.

\* \* \* \* \*